UNITED STATES PATENT OFFICE 2,202,828

PREPARATION OF POLYALKYLENE ETHER THIOAMMELINE ETHERS

Herman A. Bruson, Philadelphia, Pa., assignor to The Resinous Products & Chemical Company, Philadelphia, Pa.

No Drawing. Application July 11, 1939,
Serial No. 283,808

7 Claims. (Cl. 260—248)

This invention relates to new polyalkylene ether thioethers of the formula

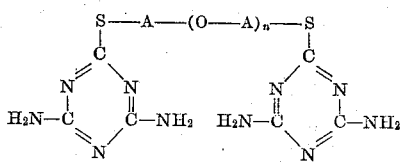

or a formula tautomeric therewith, A being a lower alkylene group of at least two carbon atoms, and $n$ being a small integer.

An object of this invention is the providing of new materials suitable for the production of resins of superior resistance to water and to light and of high stability. It is a further object to provide new materials capable of forming a resin with aldehydes which may be condensed alone with aldehydes, such as formaldehyde, or may be used with other substances capable of forming resins with aldehydes, such as urea, thiourea, dicyandiamide, melamine, phenols, sulfonamides, etc. Another object is to provide a convenient method of producing compounds of the above formula.

According to this invention thioammeline is condensed in the presence of an alkaline, acid-binding agent with a dihalogeno-polyalkylene ether having the general formula

wherein A represents as above a lower alkylene group of at least two carbon atoms, $n$ represents a small integer, preferably from one to five inclusive, and X represents a halogen.

In the preferred procedure thioammeline is first dissolved in an aqueous or alcoholic solution of an alkaline material such as sodium or potassium hydroxide. It is then treated with a dihalogeno-polyalkylene ether, which may be added to the reaction mixture in one step or in successive additions. In some cases the reaction starts at once, while in others it is necessary to warm to initiate the reaction, which is then continued and accelerated by heating, preferably under reflux between 70° C. and 100° C., although higher temperatures may be employed under pressure.

In place of the preferred alkali hydroxides there may be used any other fixed base or an acid-binding agent, such as potassium carbonate, sodium carbonate, lime, barium hydroxide, zinc hydroxide, or the like.

There may be used as a catalyst in this reaction a small amount of an amine, such as pyridine, or a soluble iodide, such as potassium iodide. Such catalysts are of value primarily in reactions involving polyalkylene ethers which are less reactive because of relatively large substituent hydrocarbon groups.

The product forms as a whitish precipitate or a fine crystalline mass which may readily be separated. By washing with dilute caustic solution traces of thioammeline may be removed. Further washing with water or alcohol yields a product sufficiently pure for most purposes, although the bis-thioammeline ether polyalkylene ether may be recrystallized when desired in a highly purified state.

The polyalkylene ether thioammeline ethers have high melting points. They are difficultly soluble in organic solvents, water, or alkalies, but dissolve readily in dilute strong inorganic acids, such as hydrochloric acid. They are useful intermediates for the preparation of resins, which they form readily upon condensation with formaldehyde, or with other aldehydes. They may be used in conjunction with urea-formaldehyde, or phenolic-formaldehyde type resins, or other resin-forming methylol compounds, to give water-resistant resins suitable for laminating, coating, binding, or impregnating wood, fabrics, paper, or other materials. They may also find application alone or in the form of their water-soluble or oil-soluble salts as insecticides, pickling inhibitors, additives for lubricating oils, intermediates for textile assistants, dyes, and drugs.

The following examples illustrate this invention:

Example 1

An aqueous solution of the sodium salt of thioammeline, made by dissolving 42.9 g. of thioammeline in a solution consisting of 13.2 g. of sodium hydroxide and 300 cc. of water, is stirred rapidly while 21.5 g. of $\beta,\beta'$-dichlorodiethyl ether is added and the reaction mixture is boiled under reflux for five hours. During this time a white powdery material separates. The powder is filtered off by suction, washed thoroughly with 10% potassium hydroxide solution to remove any traces of thioammeline, then washed with water and finally with alcohol.

The product thus obtained is a snow-white powder melting at 250–3° C. It is insoluble in hot 10% sodium hydroxide solution. Its analysis corresponds to the probable formula

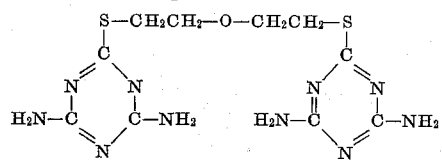

The yield is about 80% of theoretical.

Example 2

An aqueous solution of the sodium salt of thioammeline, made by dissolving 42.9 g. of thioammeline in a solution of 13.2 g. of sodium hydroxide and 300 cc. of water, is boiled under a reflux condenser with 26.2 g. of β-chloroethoxy-β'-chlorodiethyl ether (ClC₂H₄OC₂H₄OC₂H₄Cl), while the mixture is stirred vigorously. After six hours' boiling, the reaction is complete. The white powder which separates is filtered off, washed with dilute caustic soda solution, then with water, and finally with alcohol. The compound melts above 250° C. It is soluble in dilute sulfuric acid, but is insoluble in hot 10% caustic soda solution. Its analysis corresponds to the formula

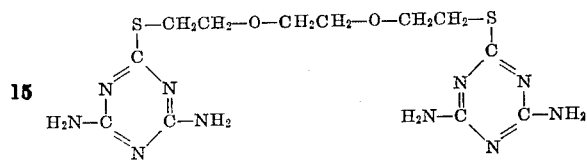

The yield is about 85% of theoretical.

In the same manner, ClC₂H₄—O—C₂H₄—O—C₂H₄ — O— C₂H₄Cl, ClC₂H₄ — O — C₂H₄ — O — C₂H₄—O—C₂H₄—O—C₂H₄Cl or similar halides containing poly-oxyethylene groups, which yield compounds of the general formula

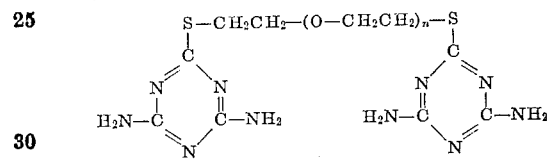

wherein $n$ is a small whole number, may be condensed with thioammeline. There may also be used such halides as ClCH₂CH₂CH₂—O—CH₂CH₂CH₂Cl, ClCH₂CH(CH₃)—O—CH(CH₃)CH₂Cl and higher homologues thereof. The corresponding bromides may be used, with, however, no economic advantage. Thioammelines bearing one or more substituted amino groups, such as alkyl-amino groups, also undergo condensation to form comparable thioethers.

I claim:

1. A process for preparing polyalkylene ether thioethers having in one of their tautomeric forms the formula

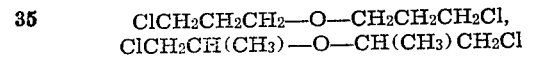

wherein A is a lower alkylene group of at least two carbon atoms and $n$ is a small integer, which comprises condensing in the presence of an acid-binding agent reacting proportions of thioammeline and a dihalogeno-polyalkylene ether of the formula X—A—(O—A)$_n$—X where A and $n$ have the above significance and X is halogen.

2. A process for preparing compounds having in one of their tautomeric forms the formula

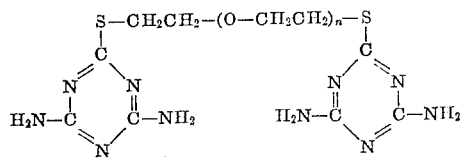

wherein $n$ is a small integer, which comprises condensing reacting proportions of an alkali metal salt of thioammeline and a polyalkylene ether dichloride of the formula Cl—CH₂CH₂—(O—CH₂CH₂)$_n$Cl 3. A compound having in one of its tautomeric forms the formula

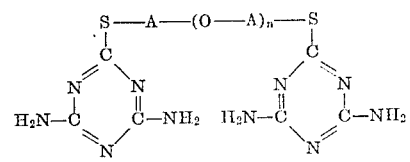

wherein A is a lower alkylene group of at least two carbon atoms and $n$ is a small integer.

4. A compound having in one of its tautomeric forms the formula

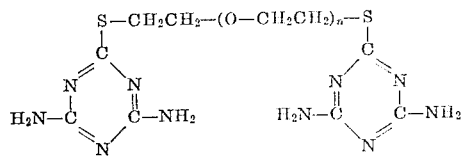

wherein $n$ is a small integer.

5. The compound having in one of its tautomeric forms the formula

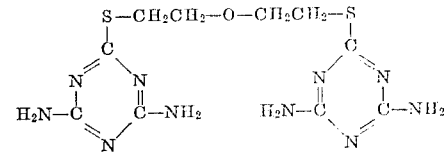

said substance being a white, crystalline powder, melting at about 250° C.

6. The compound having in one of its tautomeric forms the formula

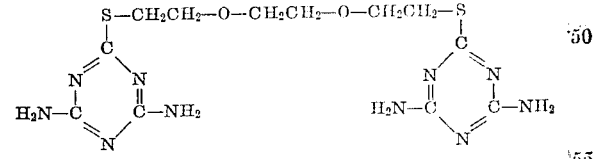

said substance being a white, crystalline powder, melting above 250° C.

7. A compound consisting of two thioammeline groups linked through the sulfur atoms by an aliphatic ether chain.

HERMAN A. BRUSON.